(12) United States Patent
Hirai

(10) Patent No.: US 7,764,036 B2
(45) Date of Patent: Jul. 27, 2010

(54) SLIDING MEMBER CONTROLLER

(75) Inventor: Kazuyuki Hirai, Kasugai (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 350 days.

(21) Appl. No.: 11/889,081

(22) Filed: Aug. 9, 2007

(65) Prior Publication Data
US 2008/0036410 A1 Feb. 14, 2008

(30) Foreign Application Priority Data
Aug. 11, 2006 (JP) ............................. 2006-219323

(51) Int. Cl.
*H02P 3/02* (2006.01)
(52) U.S. Cl. ................... 318/468; 318/466; 318/445; 318/280; 318/281; 318/283
(58) Field of Classification Search ................. 318/468, 318/466, 445, 280, 281, 283
See application file for complete search history.

(56) References Cited

U.S. PATENT DOCUMENTS

| | | | | |
|---|---|---|---|---|
| 5,605,363 A | * | 2/1997 | Kapes | .................. 292/196 |
| 6,037,727 A | * | 3/2000 | Kawanobe et al. | .......... 318/286 |
| 6,178,699 B1 | * | 1/2001 | Kawanobe et al. | ............ 49/360 |
| 6,580,242 B2 | * | 6/2003 | Hirose et al. | ................ 318/445 |
| 7,073,291 B2 | * | 7/2006 | Kawanobe et al. | ............. 49/26 |
| 7,315,145 B2 | * | 1/2008 | Uehara et al. | ............... 318/432 |
| 2005/0218850 A1 | | 10/2005 | Uehara et al. | |

* cited by examiner

*Primary Examiner*—Bentsu Ro
*Assistant Examiner*—David S Luo
(74) *Attorney, Agent, or Firm*—Posz Law Group, PLC

(57) ABSTRACT

A controller for controlling a sliding roof sets, as an operating area, a predetermined range in the sunroof slidable range and controls a motor driving the sliding roof such that the sliding roof slides in the operating area. When the sliding roof stops near a sliding lock end, the stop position is stored on an assumption that the positional deviation would occur. The sliding roof slides again from the stop position. Based on whether a traveling distance from the stop position to the sliding roof comes into contact with the tilt lock end is longer than the sunroof slidable range, the positional deviation is determined. It is possible to accurately determine whether the sliding member is locked and stopped by positional deviation or the intrusion of foreign object.

10 Claims, 6 Drawing Sheets

SLIDING MEMBER CONTROLLER

CROSS REFERENCE TO RELATED APPLICATION

This application relates to and incorporates herein by reference Japanese Patent Application No. 2006-219323 filed on Aug. 11, 2006.

FIELD OF THE INVENTION

The present invention relates to a sliding member controller, for instance, to a sliding member controller for controlling an opening/closing operation of a sliding member in an apparatus equipped with a sliding member, such as a sunroof apparatus, a power window or a sliding door provided in a vehicle or the like.

BACKGROUND OF THE INVENTION

A sliding member apparatus such as a sunroof apparatus of a vehicle has a sliding member disposed in an opening provided in a vehicle body. The sliding member is driven by an electric motor, thereby sliding between the two opposing ends of the opening for the opening and closing of the opening. For example, a sliding roof (sliding member) of a sunroof performs its tilt movement to tilt around the fulcrum provided and lying in the width direction of the vehicle so as to move its end close to the rear of the vehicle body upward and downward, and its sliding movement to slide in the longitudinal direction of the vehicle body. The sliding roof is connected to an output shaft of the drive motor and the rotation of the output shaft makes the sliding roof slide between the tilted position end and the sliding position end.

A stopper is provided at each of the opposing ends of the opening and comes into contact with the slider making the sliding roof slide, thereby stopping the sliding of the sliding roof. As a result, the sliding movement of the sliding roof is mechanically locked by the contact between the slider and the stopper. The sliding roof is arranged to be slidable within a range which is defined as a slidable range between a tilt lock end which is a mechanical stop position in a tilt-up movement and a slide lock end which is a mechanical stop position in a slide open movement.

At the time when the sliding roof is stopped at each of the above lock ends by the mechanical lock, a colliding noise occurs due to the contact between the members or the like, which may cause discomfort to passengers and the like.

To counter this, for example, US 2005/218850A1 (JP 2005-290938A, JP 2005-290939A) discloses a technique for stopping the motor slightly before the sliding roof reaches the mechanical lock end and using the inertial force occurring after the stopping of the motor to move the sliding roof to the fully open position in order to prevent a colliding noise from readily occurring when the sliding roof is stopped. The system according to this technique comprises a motor for driving a sliding member, a pulse generator which generates pulses according to rotation of the motor, a counter which counts the pulse, and a control circuit which controls the motor according to output signals generated by the counter. The system indirectly detected acquires the position of the sliding member on the basis of the count value of the pulse generated according to the rotation of the motor. The number of pulses is counted from a predetermined original position and the rotation of the motor is stopped when the count value reaches a value corresponding to a predetermined position before the sliding roof reaches the fully open position.

In this technique, the count value provided by the counter and an actual position of the sliding roof may differ from each other because of aging of the operating mechanism of the sunroof or the like. For example, if the sliding roof is forcibly opened/closed by hand or if the application of electric power to the counter is temporarily stopped during the sliding movement of the sliding roof, a difference between the actual position of the sliding roof and the count value provided by the counter, that is, the positional deviation of the sliding roof, arises. If such positional deviation occurs, it is necessary to correct the original position in order to achieve agreement between the actual position of the sliding roof and the count value provided by the counter.

For this purpose, the above sunroof apparatus detects such a positional deviation and resets the original position. Specifically, the movement range in which the sliding roof (i.e. sliding member) is slid by the rotational driving is set and a predetermined error detection range is set within the movement range. The range of the absolute count value of the pulse in this error detection range is stored in advance. Hence, when the sliding roof discontinues movement due to the detection of an overload, if the pulse count value counted by the counter falls within the range of the absolute count value, the system resets the pulse information at the lock position. As a result, when the positional deviation occurs on the sliding roof, the original position can be reset to correct the positional deviation.

However, when an overload is detected within the error detection range (i.e., the sliding roof is stopped due to a mechanical lock), the system determines that the positional deviation has occurred, and immediately resets the pulse information to set this position as a reference position. For this reason, even when the sliding roof is temporarily stopped by foreign object or the like caught in a gap in the mechanism, the system erroneously recognizes that the stopping has been caused by the positional deviation and changes the reference position, thereby causing disagreement between an actual position of the sliding roof and the pulse information.

In other words, even when the foreign object is caught between the sliding roof and the roof opening or between the slider and the stopper, the sliding movement of the sliding roof is also stopped. As a result, as in the above case when the positional deviation causes the sliding roof to be stopped by the lock mechanism, an overload may be detected in the error detection range to reset the pulse information.

In general, the condition of the positional deviation caused by aging or the like remains to be the same as long as the reference position is not reset, that is, it is continuous. On the other hand, the overload condition caused by the foreign object returns to the normal condition when the foreign object is removed, that is, it is temporary. For this reason, if the system misinterprets the stopping of the sliding roof caused by catching the foreign object as the stopping caused by the positional deviation, and resets the pulse information, then disagreement between the actual position of the sliding roof and the pulse information is caused after the foreign object has been removed, resulting in no stopping of the sliding roof at an appropriate position.

To overcome such a disadvantage, in US 2005-218850A1, when the sliding member is stopped due to overload detection, the opening/closing mode of the sliding member is automatically switched to the manual mode. Then, when the sliding member stops in a normal stopping position during the next opening/closing operation, the sliding member automatically returns to the automatic mode. At this time, however, when an overload is detected again in the same position as that in which an overload has been detected in the past and therefore, the sliding roof stops, the system determines that a positional deviation has occurred to reset the pulse information in the lock position. In this manner, it is possible to determine whether the stopping of the sliding roof is caused by an external factor such as foreign object or caused by a positional deviation due to aging or the like.

However, only when an overload is detected again in the same movement as that in which an overload has been detected in the past, it is determined that the sliding member produces a positional deviation and the pulse information is reset. Because of this, it can not be determined whether or not a positional deviation occurs as long as the sliding member is slid to the same position again. Because of such a restrictive condition for determining the positional deviation, when there occurs no situation that meets this condition, the non-determining state lasts for a long time. During that time, the actual position of the sliding roof cannot be made to agree with the pulse information, which makes it difficult to stop the sliding roof at an appropriate position.

In view of the above, there exists a need for a sliding member controller which overcomes the above mentioned problems in the conventional art. The present invention addresses this need in the conventional art as well as other needs, which will become apparent to those skilled in the art from this disclosure.

SUMMARY OF THE INVENTION

It is an object of the present invention to provide a sliding member controller which is capable of detecting a positional deviation of a sliding member with precision.

A sliding member controller according to one aspect of the invention comprises a drive motor and a control circuit. The drive motor slide-drives a sliding member in a slidable range from a first lock end to a second lock end. The control circuit sets, as an operating area of the sliding member, a predetermined range in the slidable range with respect to one of the first and second lock ends, and controls the drive motor such that an operating range of the sliding member by the drive motor falls within the operating area. The control circuit detects a stop of the sliding member, and stores stop information representing occurrence of the stop on an assumption that there is a possibility of occurrence of positional deviation in the set operating area when the stop detecting means detects the stop of the sliding member in the operating area close to the first lock end. The control circuit further determines whether or not the positional deviation occurs in the set operating area based on a stop condition, when the sliding member is operated again to come into contact with the second lock end and is stopped in a state where the stop information storage means stores the stop information.

BRIEF DESCRIPTION OF THE DRAWINGS

Other objects, features, and advantages of the present invention will become more apparent from the following detailed description made with reference to the accompanying drawings, in which like parts are designated by like reference numbers. In the drawings.

DETAILED DESCRIPTION OF THE EMBODIMENT

Figure 1:
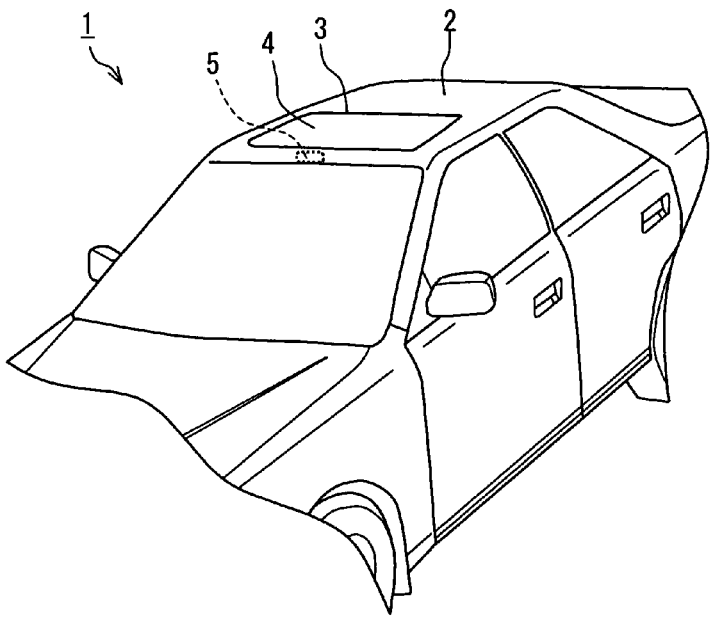
FIG. 1 is a perspective view of a sunroof apparatus mounted on a vehicle.

Referring to FIG. 1, a sliding member controller is applied to control an opening/closing operation of a sliding roof of a sunroof apparatus as an embodiment. In a vehicle 1, a sunroof apparatus has a sliding roof 4 which is a sliding member provided in a skylight 3 (i.e., top opening) formed in a roof panel 2 of the vehicle 1. A controller 5 is disposed at the end of the sliding roof 4 close to the front of the vehicle body and is equipped with a drive motor, a control circuit and the like. The sliding roof 4 is movable in the backward and forward (longitudinal) directions and the up-and-down directions by the drive motor of the controller 5. The controller 5 is a sliding member controller.

The sliding roof 4 is a plate-shaped member formed of glass, a transparent plastic resin or the like, and can be operated in a sliding movement sliding in the backward and forward directions of the vehicle body, and in a tilt movement of moving its rear end in the up-and-down directions with the fulcrum lying in the width (lateral) direction of the vehicle.

The sliding roof 4 is coupled to a slider (not shown) which slide-drives the sliding roof 4. The slider is a member which is engaged with rails (not shown) disposed in the vehicle roof face and extending in the vehicle-traveling (longitudinal) direction, and can slide along the rails. The sliding roof 4 is secured to the slider and can slide with the sliding movement of the slider. In the tilt movement range which will be described later, the sliding roof 4 slides in the up-and-down directions (tilt movement) with the sliding movement of the slider. In the sliding movement range which will be described later, the sliding roof 4 slides in the backward and forward directions (sliding movement) with the sliding movement of the slider.

Figure 2:
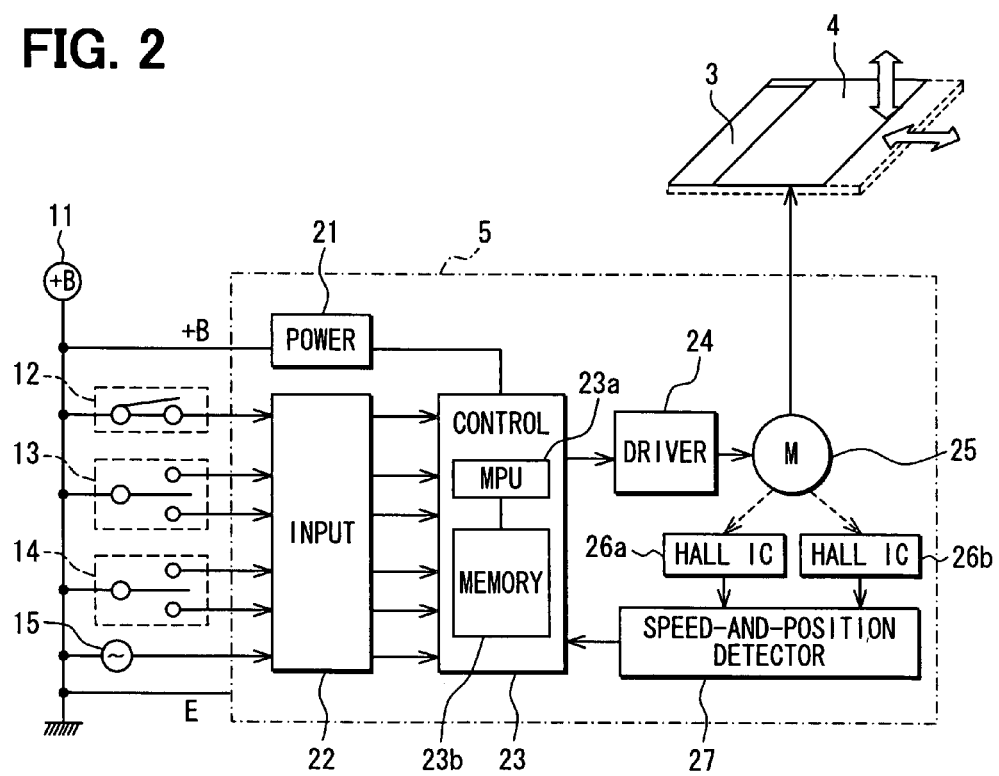
FIG. 2 is a system block diagram illustrating a sliding member controller and peripheral equipment according to an embodiment.

As illustrated in FIG. 2, the controller 5 comprises: a power source 21 for applying electric power to various electronic circuits; an input section 22 for receiving input signals from various switches and the like; a control section 23 for outputting a drive control signal to an electric motor 25 that moves the sliding roof 4; a driver circuit 24 for controlling a rotation operation of the motor 25 on the basis of the drive control signal; position sensors 26a and 26b for outputting information on the rotation of the output shaft of the motor 25; and a speed-and-position detector circuit 27 for outputting to the control section 23 information on the rotational speed and rotational position of the output shaft of the motor 25 on the basis of the rotational information detected by the position sensors 26a and 26b.

The power source 21 is electrically connected to a battery 11 and the control section 23 for application of electric power thereto. The power source 21 converts +B volts applied from the battery 11 into a predetermined drive voltage and applies the drive voltage to the control section 23.

The battery 11 is electrically connected to an ignition switch 12, a tilting switch 13, a sliding switch 14 and a vehicle speed sensor 15. These switches are electrically connected to the input section 22 of the controller 5. The input section 22 is electrically connected to the above switches and the like for applying sensor output signals and the like to the control section 23.

The ignition switch 12 is provided for starting a drive power source such as an engine. The ignition switch 12 generates an actuating signal (ON signal) by being manipulated by a user (driver or passenger), and supplies it to the input section 22. The input section 22 outputs an ON signal of the ignition switch 12 to the control section 23. The control section 23 is activated by the ON signal applied via the input section 22 from the ignition switch 12, and by the drive voltage applied from the power source 21.

The tilting switch 13 and the sliding switch 14 are both manipulated by the user for operating the opening/closing of the sliding roof 4. The tilting switch 13 is formed of a bidirectional selector switch for driving the sliding roof 4 in the tilting-up direction and the tilting-down direction. The tilting switch 13 is electrically connected to the control section 23 via the input section 22. Upon the manipulation of the tilting switch 13 by the user, the control section 23 generates a tilting drive signal to operate the motor 25 for the tilt movement, and outputs it to the driver circuit 24.

As in the case of the tilting switch 13, the sliding switch 14 is manipulated by the user and is formed of a bidirectional selector switch for sliding the sliding roof 4 in the sliding open direction and the sliding closed direction. The sliding switch 14 is also electrically connected to the control section 23 via the input section 22. Upon the manipulation of the sliding switch 14 by the user, the control section 23 generates a sliding drive signal to operate the motor 25 for the sliding movement, and outputs it to the driver circuit 24.

The vehicle speed sensor 15 outputs a signal indicative of a vehicle travel speed and is connected to the control section 23 via the input section 22 as in the case of the various switches. The vehicle speed sensor 15 detects a vehicle speed and applies the vehicle speed information to the control section 23.

The control section 23 controls the driving of the motor 25. The control section 23 comprises: a microprocessor (MPU) 23a as calculating means and a memory 23b as storage means. The control section 23 receives a reference clock signal required for operation from a clock oscillator (not shown), applies the drive control signal to the motor 25 through the driver circuit 24 based on the received reference clock signal, and the like.

The control section 23 determines a mode of operation of the motor 25, and applies the drive control signal indicative of the determined mode to the motor 25 via the driver circuit 24. The mode of operation of the motor 25 includes five modes composed of a motor stop to stop the motor 25, an open operation to cause the sliding open movement, a close operation to cause the sliding closed movement, a tilt-down operation to cause the tilting down movement and a tilt-up operation to cause the tilting up movement.

The control section 23 has a function as counting means for counting pulse signals applied from the position sensors 26a and 26b via a speed-and-position detector circuit 27 which will be described later. The memory 23b of the control section 23 stores a positional deviation determination program for causing the MPU 23a to carry out the storage of the original position, the calculation of the present position of the sliding roof 4, the determination as to occurrence of the positional deviation, and the like. The positional deviation determination program will be described later in detail with reference to the flow charts in FIGS. 4 to 9.

The driver circuit 24 is electrically connected to the control section 23 and the motor 25, and controls the rotation of the motor 25 on the basis of the drive control signal from the control section 23. The driver circuit 24 controls the driving of the motor 25 in accordance with the operation modes of the motor 25 received from the control section 23, which causes an operation of the motor 25 according to each operation mode.

The motor 25 is equipped with an output shaft rotatable in both forward and reverse directions. The output shaft of the motor 25 is mechanically connected to the slider (not shown) which slide-drives the sliding roof 4, such that the sliding roof 4 slides with the rotation of the output shaft of the motor 25. The motor 25 is electrically connected to the driver circuit 24, and is operable to perform the drive controls of the starting of rotation, the stopping of rotation, the switching of the rotational direction, a change in rotational speed and the like on the basis of the drive control signal received from the control section 23 via the driver circuit 24.

The position sensors 26a and 26b detect the rotational speed, the rotational direction and the like of the output shaft of the motor 25, and then output the detection results as rotational position information. In the present embodiment, a pair of Hall IC sensors are employed for the position sensors 26a and 26b. Sensor magnets magnetized in a multi-polar manner are respectively provided in two positions of the output shaft of the motor 25 located at a distance from each other in the rotational direction of the output shaft. Each of the Hall IC sensors converts the magnetic quantity into the electric quantity by use of a Hall element, and outputs the converted electric quantity. When the rotation of the output shaft of the motor 25 brings the sensor magnets provided on the output shaft closer to the position sensors 26a and 26b so as to effect a magnetic change, the position sensors 26a and 26b generate pulse output signals indicative of an electric quantity corresponding to the amount of the magnetic change. To provide the output signal, each of the position sensors 26a and 26b generates one pulse per one rotation of the output shaft. Each of the position sensors 26a and 26b is electrically connected to the speed-and-position detector circuit 27 and outputs the output signal to the circuit 27.

The speed-and-position detector circuit 27 forms the output signal from each of the position sensors 26a and 26b and converts it into a rectangular pulse signal. Since the position sensors 26a and 26b are disposed at locations distant from each other in the rotating direction of the output shaft, a predetermined phase difference (e.g., a half cycle) is established between the pulse output signals from the respective position sensors 26a and 26b. The speed-and-position detector circuit 27 is electrically connected to the control section 23, and outputs the formed pulse signals to the control section 23.

The control section 23 has a function as the counting means for receiving and counting the pulse signals applied from the position sensors 26a and 26b via the speed-and-position detector circuit 27. Since each of the position sensors 26a and 26b outputs one pulse signal per one rotation of the output shaft, the number of rotations of the output shaft can be calculated by counting the pulse signals. Since the number of rotations of the output shaft corresponds to the travel distance of the sliding roof 4 connected to the output shaft, the travel distance of the sliding roof 4 is indirectly detected by counting the pulse signals.

In addition, the control section 23 senses the rising edge and the falling edge of the pulse signals of the respective position sensors 26*a* and 26*b*, and detects from the combination of the rising edge and the falling edge whether the output shaft of the motor 25 rotates in the forward direction or the reverse direction. The control section 23 further comprises a timer as timer means for counting the number of pulses per unit time of each of the position sensors 26*a* and 26*b* in order to detect the rotational speed of the output shaft of the motor 25.

The control section 23 also has a function of detecting an overload when the sliding of the sliding roof 4 is blocked and the motor 25 is overloaded. That is, the control section 23 compares the drive control signal applied to the motor 25 via the driver circuit 24, with the rotational speed information applied from the motor 25 via the speed-and-position detector circuit 27. As a result, when the speed-and-position detector circuit 27 actually detects a rotational speed of nearly zero of the output shaft of the motor 25 even though a predetermined rotational speed is instructed by the drive control signal, the control section 23 determines that the sliding of the sliding roof 4 is physically blocked and the motor 25 is overloaded, and generates a stop signal. The speed-and-position detector circuit 27 and the control section 23 correspond to stop detecting means. The stop detection is not limited to detecting the load on the motor 25, but may be made by an optical sensor or the like that directly monitors the movement of the sliding roof 4.

Figure 3:
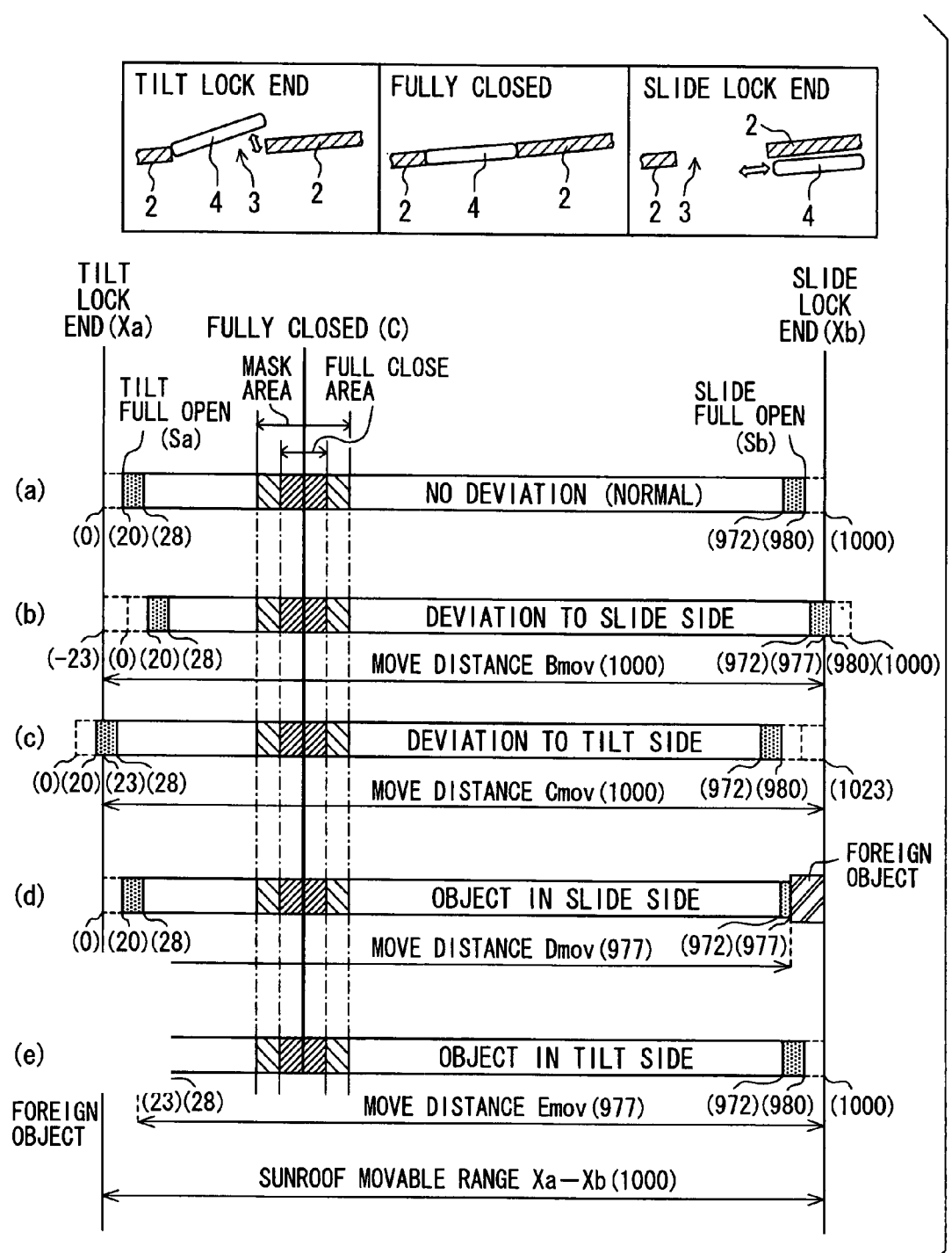
FIG. 3 is a diagram illustrating correspondence relationships between a position of a sliding roof and count information.
Figure 4:
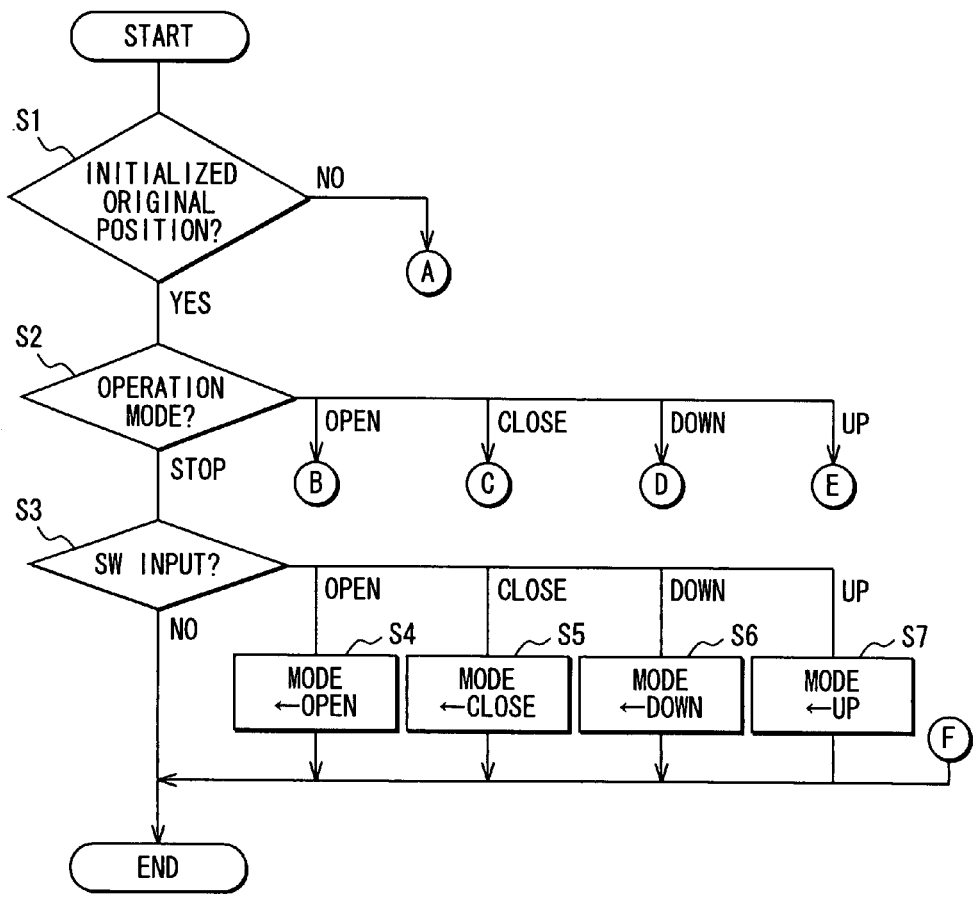
FIG. 4 is a flowchart of a process of controlling opening/closing of the sliding roof governed by the sliding member controller.

Next, the correspondence relationship between the open/closed position of the sliding roof 4 and the pulse count information will be described with reference to FIG. 3. FIG. 3 shows: the correspondence relationship (a) between the sliding roof 4 and the count value in the normal condition without the occurrence of positional deviation or the intrusion of foreign object; the correspondence relationship (b) between the sliding roof 4 and the count value when the sliding roof 4 is deviated in position toward the side of the sliding movement by the aging of the sunroof apparatus or the like; the correspondence relationship C between the sliding roof 4 and the count value when the sliding roof 4 is deviated in position toward the side of the tilt movement; the correspondence relationship (d) between the sliding roof 4 and the count value when foreign object or matter enters into an area associated with the sliding movement (the sliding movement area); and the correspondence relationship (e) between the sliding roof 4 and the count value when foreign object enters into an area associated with the tilt movement (the tilt movement area).

As shown in FIG. 3, the sliding roof 4 can slide among the tilt lock end Xa which is the sliding limit of the tilt movement, the fully closed position C in which the skylight 3 of the sunroof is fully closed, and the slide lock end Xb which is the sliding limit of the sliding movement. The sliding roof 4 performs the tilt movement to move the end close to the rear of the vehicle body upward and downward, between the tilt lock end Xa and the fully closed position C, and also performs the sliding movement to slide in the backward and forward directions, between the fully closed position C and the slide lock end Xb.

At the tilt lock end Xa, the slider (not shown) causing the tilt movement of the sliding roof 4 is locked when coming into contact with the stopper (not shown), so that the upward sliding of the sliding roof 4 is mechanically stopped. At the sliding lock end Xb, the slider (not shown) causing the sliding movement of the sliding roof 4 is locked when coming into contact with a sliding stopping member (not shown), so that the sliding of the sliding roof 4 in the direction of the rear of the vehicle body is stopped.

The fully closed position C is the position in which the sliding roof 4 fully closes the skylight 3, and a fully closed area (full close area in the figure) in which the amount of roof opening substantially reaches 0 mm is provided around the fully closed position C. In addition, a mask area is provided around the fully closed area for sensing the intrusion of foreign object and the like to prevent the foreign object and the like from intruding. If the foreign object intrudes between the roof panel 2 and the sliding roof 4, the overload condition of the motor 25 is detected in this area. Thus, the control section 23 determines that the foreign object has entered and operates the motor 25 for driving the sliding roof 4 in reverse to remove the foreign object.

A fully-open tilt position Sa is set in the vicinity of the tilt lock end Xa. The fully-open tilt position Sa is the position in which the rotation of the motor 25 is stopped to stop the tilt up movement. When the sliding roof 4 reaches the fully-open tilt position Sa during the operation of the tilt up movement, the rotation of the motor 25 is stopped. Therefore, the sliding roof 4 is moved to the tilt lock end Xa by the inertial force of the sliding roof 4. In this manner, since the rotation of the motor 25 is stopped before the tilt lock end Xa, a colliding noise will not be caused by mechanical lock, resulting in less discomfort to the user and the like.

Likewise, a fully-open sliding position Sb is set in the vicinity of the slide lock end Xb. The fully-open sliding position Sb is a position in which the rotation of the motor 25 is stopped to stop the sliding open movement. When the sliding roof 4 reaches the fully-open sliding position Sb during the operation of the sliding open movement, the rotation of the motor 25 is stopped. Therefore, the sliding roof 4 is moved to the slide lock end Xb by the inertial force of the sliding roof 4. A range between the fully-open tilt position Sa and the fully-open sliding position Sb is defined as an operating area Sa-Sb of the sliding roof 4 driven by the motor 25. The control section 23 stores the number of pulses corresponding to this operating area in advance, and controls the driving of the motor 25 through the driver circuit 24 such that the sliding roof 4 slides within the operating area. The control section 23 corresponds to operating area setting means of the present embodiment. The control section 23 and the driver circuit 24 receiving the drive control signal from the control section 23 to control the driving of the motor 25 correspond to driving motor control means.

Information on the present position of the sliding roof 4 is indirectly detected by counting the pulse signals from the motor 25 at the control section 23 of the controller 5. The control section 23 counts the pulse signals from the motor 25 and stores the count value as present position information.

The control section 23 senses the rotational direction of the motor 25 on the basis of the pulse signals applied from the speed-and-position detector circuit 27 as well as the position sensors 26*a* and 26*b*. When the motor 25 rotates in the forward direction, the control section 23 increments the count value of the number of pulses by one for every rising edge of the pulse signal. On the other hand, when the motor 25 rotates in the reverse direction, the control section 23 decrements the count value of the number of pulses by one for every rising edge of the pulse signal.

As shown in correspondence relationship (a) in FIG. 3, the tilt lock end Xa is defined as the original position and the count value of the number of pulses at this point is set at zero (0). The sliding lock end Xb is located at the count value of 1000. This number of pulses is equivalent to approximately 500 mm of the actual traveling distance of the sliding roof 4. The mechanically slidable range of the sliding roof 4 (sunroof slidable range Xa-Xb) is equivalent to 1000 pulses between the tilt lock end Xa and the sliding lock end Xb. The 1000 pulses are invariant because it is determined based on the distance between the tilt lock end Xa and the sliding lock end Xb, and is equivalent to approximately 500 mm of the actual traveling distance.

The fully-open sliding position Sb is set in a position of 980 in terms of the number of pulses counted from the original position. A predetermined range from the fully-open sliding position Sb toward the fully closed position C is set as a positional deviation detection area (dot-filled area in FIG. 3). The positional deviation detection area is set in an area representing 8 pulses from 980 which is the fully-open slid position Sb to 972.

Next, the principal of discriminating between a lock stop caused by the positional deviation and a lock stop caused by the intrusion of foreign object or the like is described.

First, the lock stop caused by the positional deviation is described.

As shown in the correspondence relationship (b) in FIG. 3, when the positional deviation occurs in the direction of the end of the sliding movement, the sliding of the sliding roof 4 is automatically stopped at the slide lock end Xb, and thus the motor 25 is overloaded. The control section 23 of the controller 5 senses the overload. When this occurs in the positional deviation detection area close to the slide lock end Xb, the control section 23 determines that there is a possibility of positional deviation.

The fully-open tilt position Sa near the tilt lock end Xa is set in a position of 20 in terms of the number of pulses counted from the original position. A predetermined range from the fully-open tilt position Sa toward the fully closed position C is defined as a positional deviation detection area (the dot-filled area in FIG. 3). The positional deviation detection area is set in an area representing 8 pulses from 20, thus resulting in the fully-open tilt position Sa to 28.

On the other hand, as shown in the correspondence relationship C in FIG. 3, when the positional deviation occurs in the direction of the end of the tilt movement, the sliding of the sliding roof 4 is mechanically stopped at the tilt lock end Xa, and thus the motor 25 is overloaded. The control section 23 senses the overload. When this occurs in the positional deviation detection area close to the tilt lock end Xa, the control section 23 determines that there is a possibility of the positional deviation.

As shown in the correspondence relationship (d) in FIG. 3, the intrusion of foreign object or the like into an area associated with the sliding movement hinders the sliding roof 4 from sliding to the slide lock end Xb. At this point, the overload on the motor 25 is detected. For example, if a lock stop is caused by foreign object in a position, corresponding to 977 pulses, close to the end of the sliding movement, the detected overload is within the positional deviation detection area in the sliding movement. Thus, there is a possibility that the lock stop is erroneously determined as that caused by the positional deviation.

As shown in the correspondence relationship (e) in FIG. 3, the intrusion of foreign object or the like into an area associated with the tilt movement hinders the sliding roof 4 from sliding to the tilt lock end Xa. At this point, the overload on the motor 25 is detected. For example, if a lock stop is caused by foreign object in a position, corresponding to 23 pulses, close to the end of the tilt movement, the detected overload is within the positional deviation detection area on the tilt movement side. Thus, there is a possibility that the lock stop is erroneously determined as that caused by the positional deviation.

When the stopping of the sliding roof 4 is detected during the operation of moving the sliding roof 4 toward one of the lock ends, the number of pulses at the stopping is stored. Then, the control section 23 clears the control of stopping the motor 25 at the fully open position (Sa, Sb), so that the sliding roof 4 can be driven by the motor 25 to slide to the lock end (Xa, Xb). Thereafter, the sliding roof 4 is slid again to come into contact with a lock end opposite to the lock end and stop there. From the stop condition at this point, the control section 23 determines whether the lock stop is caused by the positional deviation or the intrusion of foreign object.

Specifically, in the case of the stop caused by the positional deviation in the sliding movement as illustrated in the relationship (b), when the sliding roof 4 is slid to the other lock end (the tilt lock end Xa in this case) to come into contact with the tilt lock end Xa, the traveling distance (Bmov) of the sliding roof 4 from the stop position in the sliding movement area to the stop position at the tilt lock end Xa is equivalent to 1000 pulses from −23 to 977 which are equal to 1000 pulses of the sunroof slidable range Xa-Xb.

On the other hand, in the case of the stop caused by the intrusion of foreign object in the sliding movement as illustrated in the relationship (d), when the sliding roof 4 is slid to the other tilt lock end Xa to come into contact with the tilt lock end Xa, the traveling distance (Dmov) of the sliding roof 4 from the stop position in the sliding-movement area to the stop position at the tilt lock end Xa is equivalent to 977 pulses from zero to 977 which are less than 1000 pulses of the sunroof slidable range Xa-Xb.

Likewise, in the case of the stop caused by the positional deviation in the tilt movement as illustrated in the relationship (c), when the sliding roof 4 is slid to the other lock end (the slide lock end Xb in this case) to come into contact with the slide lock end Xb, the traveling distance (Cmov) of the sliding roof 4 from the stop position in the tilt movement area to the stop position at the slide lock end Xb is equivalent to 1000 pulses from 23 to 1023 which are equal to 1000 pulses of the sunroof slidable range Xa-Xb.

On the other hand, in the case of the stop caused by the intrusion of foreign object in the tilt movement as illustrated in the relationship (e), when the sliding roof 4 is slid to the other slide lock end Xb to come into contact with the slide lock end Xb, the traveling distance (Emov) of the sliding roof 4 from the stop position in the tilt movement area to the stop position at the slide lock end Xb is equivalent to 977 pulses from 23 to 1000 which are less than 1000 pulses of the sunroof slidable range Xa-Xb.

In this manner, when the sliding roof 4 is slid from the stop position close to one of the lock ends toward the other lock end, the traveling distance between the stop positions when the positional deviation occurs is different from that when the intrusion of foreign object occurs. Accordingly, when the lock stop occurs in one of the lock ends, the control section 23 stores the stop position in the memory 23b. Then, the control section 23 slides the sliding roof 4 toward the other lock end, and then calculates a traveling distance of the sliding roof 4 until it comes into contact with the other lock end. If the traveling distance thus calculated is less than the sunroof slidable range Xa-Xb, the control section 23 determines that the stop is caused by the intrusion of foreign object or the like. If the traveling distance thus calculated is equal to or greater than the sunroof slidable range Xa-Xb, the control section 23 determines that the stop is caused by contact between the sliding roof 4 and the lock end due to the positional deviation. The memory 23b storing the lock stop position corresponds to stop information storage means. The lock stop position corresponds to stop information of the present embodiment.

Further, in the present embodiment, after the sliding roof 4 comes to a lock stop in the vicinity of one of the lock ends, the sliding roof 4 is slid again toward the same lock end. Then, from the stop condition at the time when the sliding roof 4 has come into contact with the lock end, the control section 23 determines also whether or not the stop is caused by the positional deviation.

That is, in the case of the positional deviation toward the end of the sliding movement as illustrated in the relationship (b), even though the sliding roof 4 is slid again toward the slid lock end, the sliding roof 4 comes into the slide lock end and stops at the same location (in the position corresponding to 980 pulses in this case).

On the other hand, in the case of the intrusion of foreign object into the sliding movement area as illustrated in the relationship (d), if the foreign object is removed, the normal condition of the relationship (a) results. For this reason, when the sliding roof 4 is slid toward the same slide lock end again, the sliding roof 4 slides to either the fully-open slide position Sb or a position closer to the slide lock end Xb.

However, if the foreign object is not removed, the sliding roof 4 comes into contact with the foreign object and stops in the same position (position corresponding to 977 pulses in this case) again.

Accordingly, in the present embodiment, when the sliding roof 4 comes in the lock stop in a position close to one of the lock ends and it is determined that there is a possibility of the positional deviation, the sliding roof 4 is slid toward the same lock end again. In this sliding, if the sliding roof 4 slides to either the fully open position close to the lock end concerned (i.e., the end of the operating area Sa-Sb) or a position closer to the lock end concerned, it is determined that no positional deviation occurs on the assumption that the lock stop is caused by foreign object and the foreign object has been already removed.

On the other hand, after the sliding roof 4 has come in a lock stop in a position close to one of the lock ends, when the sliding roof 4 is slid toward the same lock end again, if a lock stop is detected in the positional deviation detection area, it is assumed that the positional deviation occurs or the foreign object entering has not yet been removed. Therefore, the determination is put on hold without immediately making the determination that there is no positional deviation.

Next, the procedure of determining the occurrence of the positional deviation will be described.

(1) Upon detection of a lock stop in a position close to one of the lock ends, the control section 23 stores the stop position information as the number of pulses on the assumption that there is a possibility of positional deviation, and then clears the control of stopping the motor 25 at the lock end.

(2) Then, the sliding roof 4 slides to the lock end opposite the lock end at which the sliding roof 4 has previously come in the lock stop, and stops at the lock end. The control section 23 stores the stop position as the number of pulses when the sliding roof 4 stops at the lock end.

(3) The control section 23 subtracts the number of pulses in the stop position when the sliding roof 4 stops close to the other lock end, from the number of pulses in the position in which the lock stop has previously occurred, to calculate a traveling distance of the sliding roof 4 from the previous lock stop position to the stop position close to the other lock end.

(4) If the calculated traveling distance is equal to or greater than the sunroof slidable range, the control section 23 determines that the positional deviation has occurred. If it is less than the sunroof slidable range, the control section 23 determines that the foreign object has entered.

(5) After process (1), when the sliding roof 4 slides toward the lock end at the side as the lock end where the sliding roof 4 has previously come in the lock stop, if the sliding roof 4 slides to the fully open position close to the lock end or a position closer to the lock end, the control section 23 determines that the lock stop has been caused by the intrusion of foreign object and the foreign object has already been removed.

Next, the procedure of controlling the sliding member by the sliding member controller according to the present embodiment will be described in detail with reference to the flowcharts in FIGS. 4 to 9.

The control section 23 of the controller 5 stores the positional deviation determination program. Based on this positional deviation determination program, the MPU 23a executes: original position storage processing for storing the original position as numerical information in a region of the memory 23b of the control section 23; initialization storage processing for setting an initialized flag to store whether or not the original position is initialized; present position storage processing for counting the number of pulses outputted from the motor 25 with respect to the original position and storing the present position of the sliding roof 4 as numerical information; and positional deviation storage processing for assuming that there is a possibility of the occurrence of positional deviation when a lock stop occurs, and storing information on whether the lock position is located in the sliding movement area or the tilt movement area and storing the stop position. The MPU 23a executing the positional deviation determination program and the memory 23b storing the positional deviation determination program correspond to positional deviation determination means.

The memory 23b of the control section 23 stores an initialization flag (initialized or not) indicating whether or not the original position is initialized, and the present position (numerical information) determined by counting the number of pulses with respect to the original position. In addition, the memory 23b assumes that, when the sliding roof 4 comes in a lock stop during the sliding movement, there is a possibility of occurrence of the positional deviation toward the lock end located close to the position of the lock stop, and stores information on the presence/absence of the lock stop and the direction of the lock stop (the absence of positional deviation, either the sliding movement area or the tilt movement area) as positional deviation detection information. Further, the memory 23b stores the slide lock position (numerical information) which is a stop position when the lock stop occurs in the sliding movement area, and the tilt lock position (numerical information) which is a stop position when the lock stop occurs in the tilt movement area.

First, at step S1, the control section 23 determines whether or not the original position is initialized. The original position is a reference position for measuring the traveling distance of the sliding member. In the present embodiment, the tilt lock end Xa is set as the original position. The processing is performed according to whether or not the initialized flag stored in the control section 23 is set.

Figure 5:
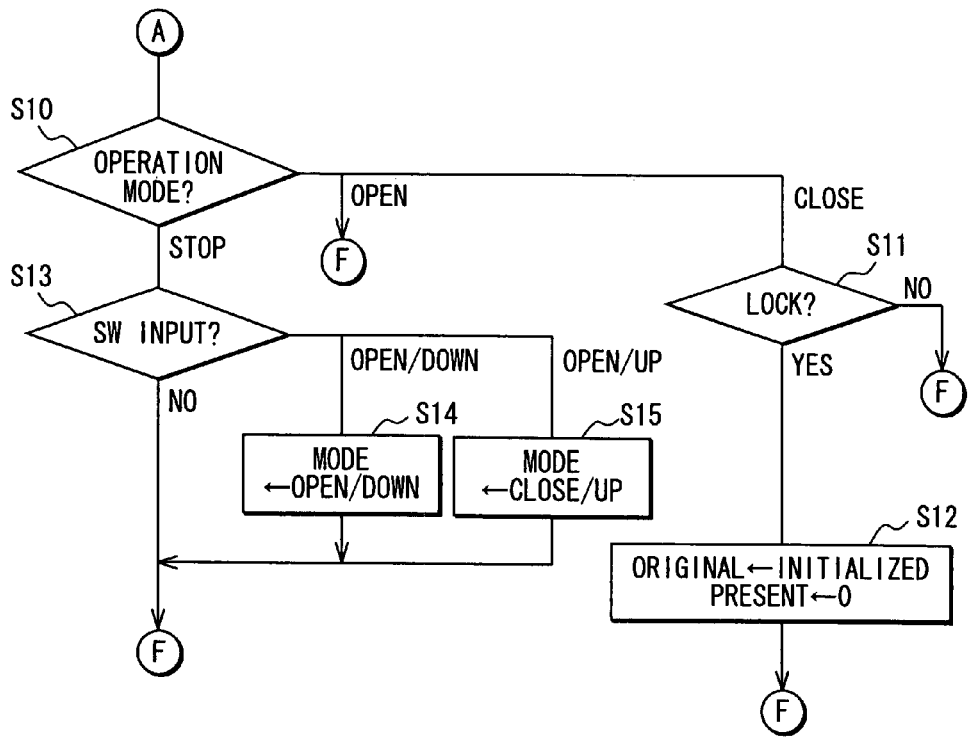
FIG. 5 is a flowchart of a part of the process of controlling opening/closing of the sliding roof shown in FIG. 4.
Figure 7:
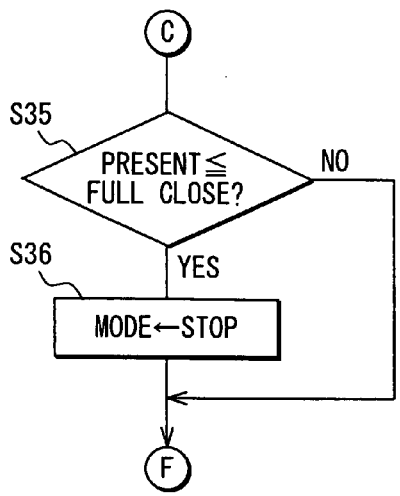
FIG. 7 is a flowchart of a part of the process of controlling opening/closing of the sliding roof shown in FIG. 4.
Figure 8:
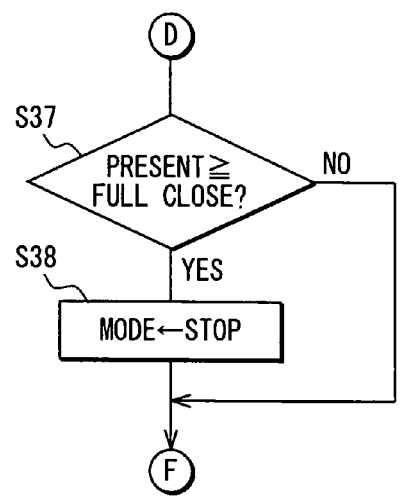
FIG. 8 is a flowchart of a part of the process of controlling opening/closing of the sliding roof shown in FIG. 4.

If the original position is not initialized, the processing proceeds to step S10 to perform the initialization processing shown in FIG. 5. If the original position is initialized, the control section 23 at step S2 detects the current mode of operation of the motor 25. If the motor 25 is in operation, the control section 23 performs processing according to the operation mode (open operation, close operation, down (tilt-down) actuation, and up (tilt-up) actuation)

On the other hand, when the control section 23 determines at step S2 that the motor 25 is at stop, the processing proceeds to step S3 to determine whether or not there is a switch input, that is, whether the tilt switch 13 or the slide switch 14 is turned on. If the open operation is instructed through the slide switch 14, the processing proceeds to step S4, wherein the control section 23 changes the rotational direction of the motor 25 to the open direction and sets the operation mode to cause the open operation. On the other hand, if the close operation is instructed through the slide switch 14, the processing proceeds to step S5, wherein the control section 23 changes the rotational direction of the motor 25 to the closed direction and sets the operation mode to cause the close operation.

Further, if the tilt-down operation is instructed through the tilt switch 13, the processing proceeds to step S6, wherein the control section 23 changes the rotational direction of the motor 25 to the downward direction and sets the operation mode to cause the tilt-down operation. On the other hand, if the tilt-up operation is instructed through the tilt switch 13, the processing proceeds to step S7, wherein the control section 23 changes the rotational direction of the motor 25 to the upward direction and sets the operation mode to cause the tilt-up operation.

When it is determined at step S1 that the original position is not initialized, the processing proceeds to step S10 (FIG. 5) to determine the current operation mode of the motor 25. As a result, if the operation mode is in the closed/tilt-up operation, the control section 23 determines at step S11 whether or not a lock condition is detected. If the lock condition is detected, the processing proceeds to step S12 to set the initialized flag in the original position and to write zero (0) on the stored present position information for reset. As a result, the tilt lock end Xa is set as the original position. When the control section 23 determines at step S10 that the motor 25 is in the stop condition, the processing proceeds to step S13 to determine whether or not the switch input is detected. If the switch input is detected, the control section 23 sets the operation mode in accordance with the input switch condition to step S14 or S15.

Figure 6:
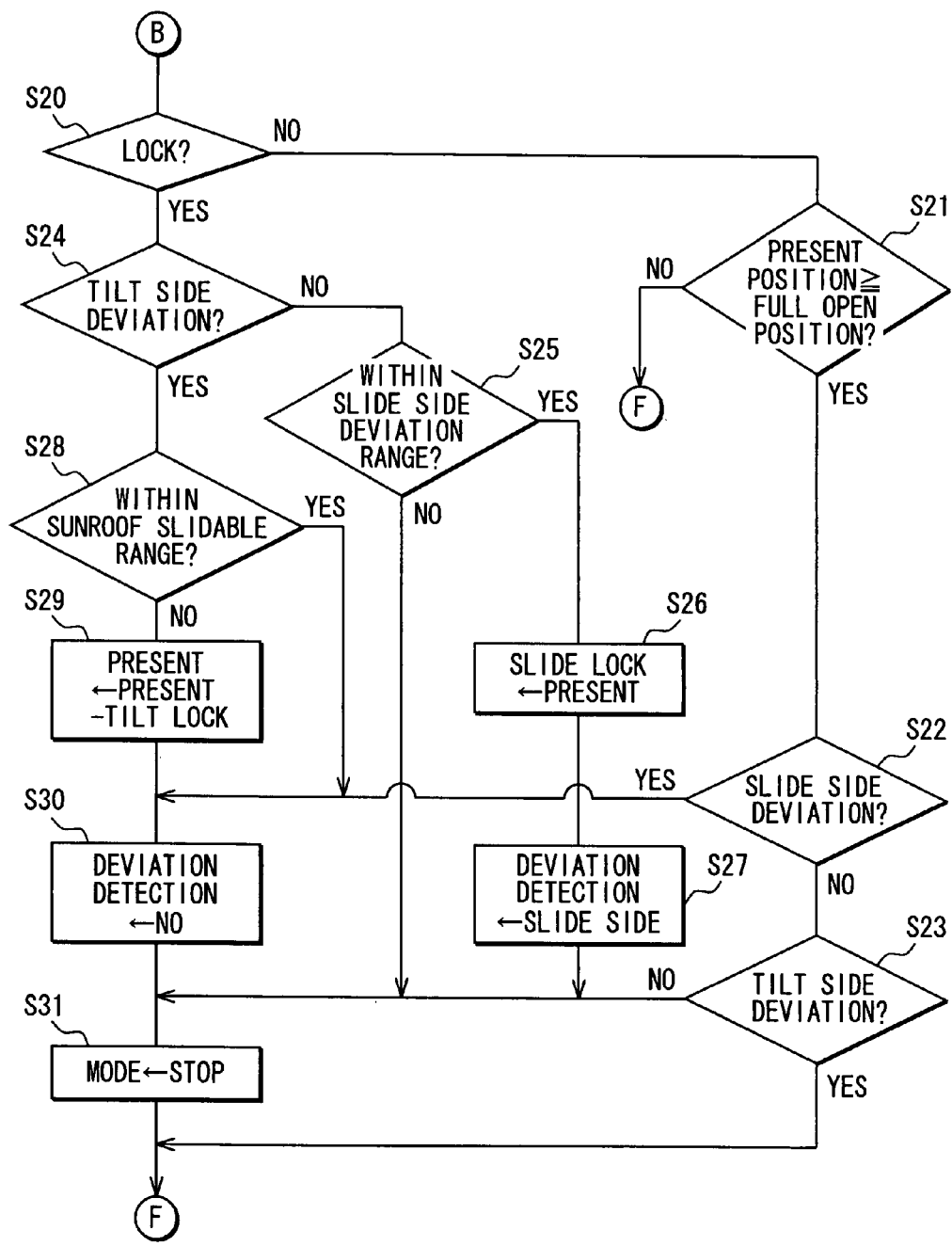
FIG. 6 is a flowchart of a part of the process of controlling opening/closing of the sliding roof shown in FIG. 4.
Figure 9:
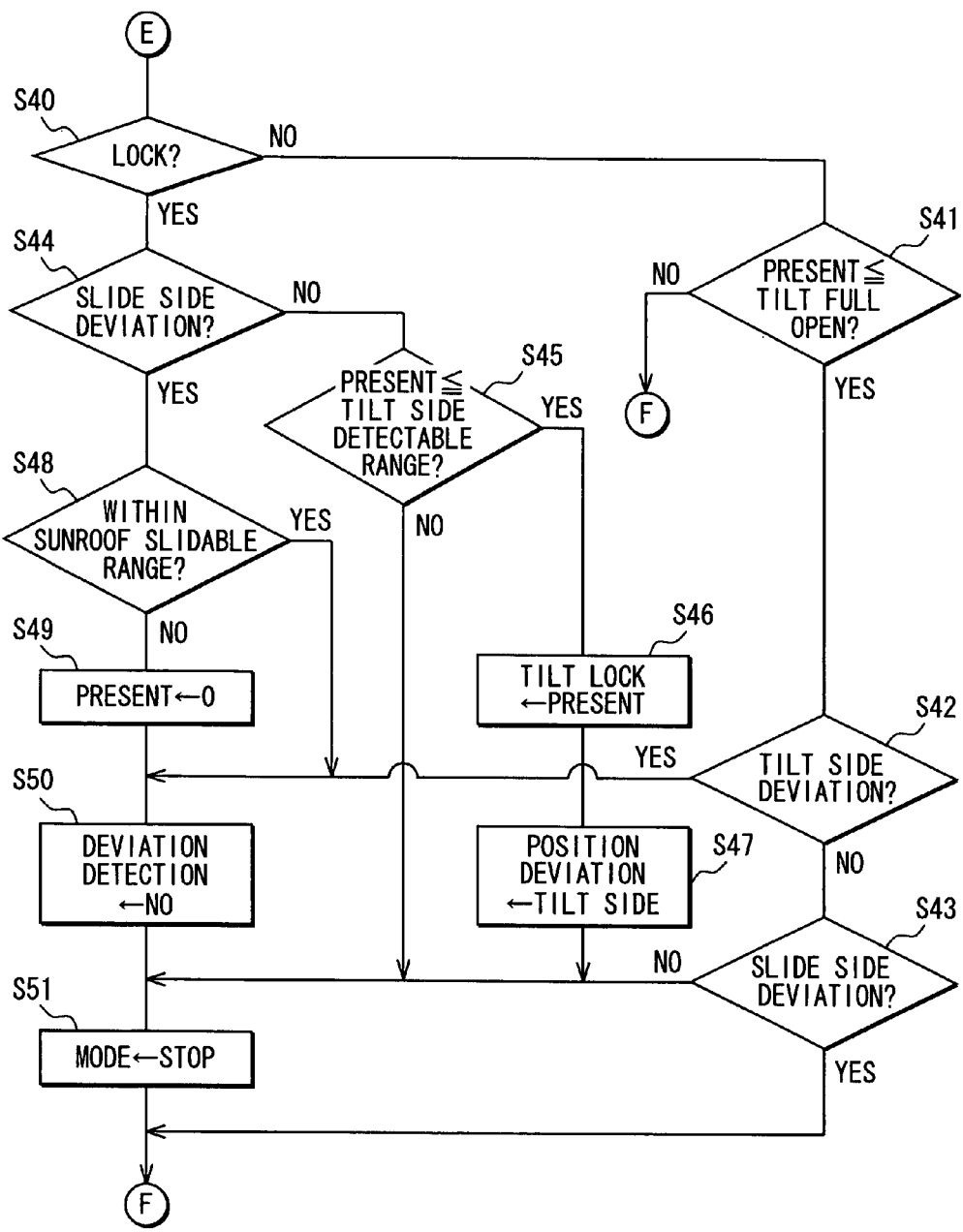
FIG. 9 is a flowchart of a part of the process of controlling opening/closing of the sliding roof shown in FIG. 4.

When it is determined at step S2 that the operation mode is in the open operation (B), the control section 23 determines at step S20 in FIG. 6 whether or not a lock is detected. As a result, if the lock is not detected, the processing proceeds to step S21. At step S21, if the present position is located closer to the fully closed position C than the fully-open sliding position Sb (present position<fully-open sliding position), the procedure terminates. However, if the present position is located closer to the slide lock end Xb than the fully-open slide position Sb (present position≧fully-open sliding position), the processing proceeds to step S22, wherein the positional deviation detection information stored in the memory 23b is obtained to determine whether or not a lock condition (i.e., the condition in which there is a possibility of positional deviation) has been previously detected in the sliding movement area.

The memory 23b stores sliding movement area as the positional deviation detection information. If a lock has been previously detected in the sliding movement area, the processing proceeds to step S30 which will be described later, wherein the positional deviation detection information is initialized to determine that there is no positional deviation. When it is determined at step S22 that a lock has not been detected in the sliding movement area, the control section 23 determines at step S23 on the basis of the positional deviation detection information whether or not a lock has been previously detected in the tilt movement area. As a result, if it is determined that the lock has not been detected in the tilt movement area, the processing proceeds to step S31 to set the operation mode to the motor stop for stopping the operation of the motor 25. If it is determined at step S23 that the lock has been previously detected in the tilt movement area, the operation mode is not changed and the procedure terminates.

On the other hand, when, at step S20, a lock is detected in the sliding movement area, the control section 23 obtains the positional deviation detection information stored in the memory 23b, and determines at step S24 whether or not a lock has been previously detected in the tilt movement area, that is, whether there is a positional deviation in the tilt side. As a result, when it is determined that the lock has not been detected, the control section 23 determines at step S25 whether or not the present position is within the positional deviation detection area in the sliding movement area. As a result, if the present position is out of the positional deviation detection area in the sliding movement area, at step S31 the operation mode is changed to the motor stop to stop the operation of the motor 25. On the other hand, when, at step S25, the present position is within the positional deviation detection area in the sliding movement area, it is determined that the possibility of the positional deviation arises in the sliding movement area. Then, at step S26, the slide lock position is defined as the present position. At step S27, the sliding movement area is written on the positional deviation detection information stored in the memory 23b.

If it is determined at step S24 that a lock has been previously detected in the tilt movement area, the processing proceeds to step S28 to determine whether or not the traveling distance between the present position in which the lock has been detected and the tilt lock position which has been detected at the same time and stored (i.e., present position-tilt lock position) is smaller than the sunroof slidable range. As a result, when the traveling distance is smaller than the sunroof slidable range, the control section 23 determines that the lock detection in the tilt movement area which has been previously detected is caused by the intrusion of foreign object or the like, but not by the positional deviation. Then, the processing proceeds to step S30 to determine that the positional deviation is not detected. On the other hand, if the traveling distance is equal to or greater than the sunroof slidable range, the control section 23 determines that the lock detection in the tilt movement area which has been previously detected is caused by the positional deviation (the condition illustrated in the correspondence relationship (c) in FIG. 3). Then, the processing proceeds to step S29 to correct the positional deviation.

At step S29, "present position=present position−tilt lock position" is determined and the present position is defined as the position of the slide lock end Xb. Thus, the positional deviation is corrected to change the condition back to the normal condition. Subsequently, at step S30, the positional deviation detection is initialized, resulting in the absence of the positional deviation. The processing proceeds to step S31 to change the operation mode to the motor stop for stopping the operation of the motor 25.

When it is determined in the operation assigning mode at step S2 that the current operation mode is in the close operation, the processing proceeds to step S35 (FIG. 7) to determine whether or not the present position reaches the fully closed position C. As a result, if the present position does not reach the fully closed position C (present position>fully closed position), the procedure terminates. If the present position has reached the fully closed position C (present position≦fully closed position), the operation mode is changed to the motor stop to stop the operation of the motor 25.

When it is determined in the operation assigning mode at step S2 that the current operation mode is in the tilt-down operation (D), the processing proceeds to step S37 (FIG. 8) to determine whether or not the present position reaches the fully closed position C. As a result, if the present position does not reach the fully closed position C (present position<fully closed position), the procedure terminates. If the present position has reached the fully closed position C (present position≧fully closed position), the operation mode is changed to the motor stop to stop the operation of the motor 25.

When it is determined at step S2 that the operation mode is in the tilt-up operation (E), it is determined at step S40 whether or not a lock is detected. As a result, if the lock is not detected, the processing proceeds to step S41. At step S41, if the present position is located closer to the fully closed position C than the fully-open tilt position Sa (present position>fully-open tilt position), the procedure terminates. However, if the present position is located closer to the tilt lock end Xa than the fully-open tilt position Sa (present position≦fully-open tilt position), the processing proceeds to step S42, wherein the positional deviation detection information stored in the memory 23b is obtained to determine whether or not a lock detection has been previously detected in the tilt movement area.

When the "tilt movement area" is stored as the positional deviation detection information in the memory 23b and a lock has been previously detected in the tilt movement area, the processing proceeds to step S50 which will be described later, wherein the positional deviation detection information is initialized to determine that there is no positional deviation. When it is determined at step S42 that the lock has not been previously detected in the tilt movement area, the control section 23 determines at step S43 whether or not a lock has been previously detected in the slide movement area. As a result, if it is determined that the lock has not been detected in the slide movement area, the processing proceeds to step S51 to set the operation mode to the motor stop for stopping the operation of the motor 25. If it is determined at step S43 that the lock has been previously detected in the slide movement area, the operation mode is not changed and the procedure terminates.

On the other hand, when at step S40 a lock is detected in the tilt movement area, at step S44 the control section 23 obtains the positional deviation detection information stored in the memory 23b, and determines whether or not a lock condition (i.e., the condition in which there is a possibility of positional deviation) has been previously detected in the slide movement area. As a result, when it is determined that the lock has not been detected, the control section 23 determines at step S45 whether or not the present position is within the positional deviation detection area in the tilt movement area. As a result, if the present position is out of the positional deviation detection area in the tilt movement area, at step S51 the operation mode is changed to the motor stop to stop the operation of the motor 25. On the other hand, when, at step S45, the present position is within the positional deviation detection area in the tilt movement area, it is determined that the possibility of the positional deviation arises in the tilt movement area. Then, at step S46, the tilt lock position is defined as the present position. At step S47, the positional deviation detection position is determined to be in the tilt movement area.

If it is determined at step S44 that the lock has been previously detected in the sliding movement area, the processing proceeds to step S48 to determine whether or not the traveling distance from the previously detected and stored slide lock position to the present position in which the lock is detected (i.e., present position-slide lock position) is smaller than the sunroof slidable range. As a result, when the traveling distance is smaller than the sunroof slidable range, the control section 23 determines that the lock detection in the sliding movement area which has been previously detected is caused by the intrusion of foreign object or the like. Then, the processing proceeds to step S50 to determine that the positional deviation is not detected. On the other hand, if the traveling distance is equal to or greater than the sunroof slidable range, the control section 23 determines that the lock detection in the sliding movement area which has been previously detected is caused by the positional deviation (the condition illustrated in the correspondence relationship (b) in FIG. 3). Then, the processing proceeds to step S49 to correct the positional deviation.

At step 49, "present position=zero" is determined and the present position is defined as the position of the slide lock end Xb, that is, the original position. Thus, the positional deviation is corrected to change the condition back into the normal condition. Subsequently, at step S50, the positional deviation detection information stored in the memory 23b is initialized, resulting in the absence of the positional deviation. The processing proceeds to step S51 to change the operation mode into the motor stop for stopping the operation of the motor 25.

Next, the procedure of determining whether or not positional deviation occurs will be described in detail with reference to the diagram in FIG. 3 and the flowcharts in FIGS. 4 to 9.

First, when a lock stop is detected near the slide lock end Xb during the open operation, it is determined at step S20 that a lock is detected, and at step S24 whether or not positional deviation has been previously detected in the tilt movement area. Since this lock detection is made for the first time, at steps S25, S26 the slide lock position is defined as the present position, and the positional deviation detection position is defined to be in the sliding movement area. Thereafter, at step S31, the operation of the motor 25 is stopped. As a result, the control section 23 stores the possibility of occurrence of the positional deviation in the sliding movement area.

Thereafter, the sliding roof 4 slides to the tilt lock end Xa, and at step S40 a lock is detected at the tilt lock end Xa. With this as a trigger, it is determined at step S44 whether or not a lock has been previously detected in the sliding movement area. In this case, it is determined that the lock has been previously detected in the sliding movement area, and the processing proceeds to step S48. At step S48, the slide lock position stored at step S26 is read, and it is determined whether or not the traveling distance of the sliding roof 4 from the slide lock position thus read to the present tilt lock position is equal to the sunroof slidable range.

As described above, when the cause of the previous lock stop in the sliding movement area is the positional deviation as in the case of the relationship (b) in FIG. 3, the sliding roof 4 can slide within the sunroof slidable range from the slide lock end Xb to the tilt lock end Xa. On the other hand, when it is the intrusion of foreign object or the like as in the case of the relationship (d) in FIG. 3, the sliding roof 4 cannot slide in the sunroof slidable range from the position of the lock stop to the tilt lock end Xa due to the intrusion of the foreign object.

For this reason, it is determined at step S48 whether or not the traveling distance of the sliding roof 4 from the present position (i.e., tilt lock end Xa) to the previous slide lock position corresponds the sunroof slidable range, that is, 1000 pulses in the FIG. 3. As a result, when the traveling distance is equal to or greater than the sunroof slidable range, it is determined that the cause of the previous lock stop in the sliding movement area is the positional deviation. To correct the positional deviation, at step S49, the present position, that is, the tilt lock end Xa is set to zero.

On the other hand, when the traveling distance of the sliding roof 4 is less than the sunroof slidable range, it is determined that the cause of the previous lock stop at the lock end is the intrusion of foreign object or the like. In this case, since the correction of positional deviation is not required, the procedure skips step S49 and proceeds to step S50 to determine that positional deviation is not detected.

When a lock stop is detected near the tilt lock end Xa during the tilt-up operation, a similar procedure is performed to determine whether or not positional deviation occurs.

That is, when a lock is detected near the tilt lock end Xa first, it is determined at step S40 that a lock is detected, and at step S46 the tilt lock position is defined as the present position, and the positional deviation detection position is defined to be in the tilt movement area. As a result, the control section 23 stores the possibility of occurrence of the positional deviation in the tilt movement area.

Then, the sliding roof 4 moves again and slides to the slide lock end Xb, and at step S20 a lock is detected at the slide lock end Xb. With this as a trigger, it is determined at step S24 whether or not a lock has been previously detected in the tilt movement area. Then, the processing proceeds to step S28. At step S28, the tilt lock position stored at step S46 is read, and it is determined at step S28 whether or not the traveling distance of the sliding roof 4 from the tilt lock position thus read to the present tilt lock position is equal to the sunroof slidable range.

As a result, when the traveling distance is equal to or greater than the sunroof slidable range, it is determined that the cause of the previous lock stop in the tilt movement area is the positional deviation. To correct the positional deviation, at step S29, the present position, that is, the slide lock end Xb, is calculated from the present position-tilt lock position, and the result is stored as the present position. In the present embodiment, the value of the present position-tilt lock position is 1000.

On the other hand, when the traveling distance of the sliding roof 4 is less than the sunroof slidable range, it is determined that the cause of the previous lock stop at the lock end is the intrusion of foreign object or the like. In this case, since the correction of positional deviation is not required, the procedure skips step S29 and proceeds to step S30 to determine that the positional deviation is not detected.

In this manner, the traveling distance from one lock end to the other lock end, that is, the stop condition, is different depending on whether the sliding roof 4 is stopped by the positional deviation or by the intrusion of foreign object or the like. In the present embodiment, this difference is used to discriminate between the positional deviation and the intrusion of foreign object.

In the present embodiment, the determination whether or not positional deviation occurs is made on the basis of the stopping conditions in an area of the lock stop and at the lock end opposite to the area. However, it is also possible to determine whether or not positional deviation occurs on the basis of the stopping conditions in an area of the lock stop and at the lock end in the same area as the area, as in the conventional case, which will be described below in detail.

When a lock is detected in the sliding movement area during the open operation, the occurrence of the positional deviation detection in the sliding movement area is stored at step S27. If the lock is caused by the intrusion of foreign object or the like, the removal of the foreign object make it possible for the sliding roof 4 to slide to the fully-open slide position Sb without a lock. On the other hand, if the lock is caused by the positional deviation, when the sliding roof 4 slides toward the end of the sliding movement, it is locked in the same position again.

For this reason, when the open operation is performed again after the lock has been detected in the sliding movement area, it is determined at step S20 that a lock is not detected. Then, at step S21, the sliding roof 4 slides to the fully-open slide position Sb. Then, the processing proceeds to step S22 to determine whether or not a lock has been previously detected in the sliding movement area. As a result, if it is determined that the positional deviation has been previously detected in the sliding movement area, it is determined that the previous lock detection in the sliding movement area is caused by the intrusion of foreign object or the like and the foreign object has been already removed. Then, at step S30, the condition is changed to the condition without detection of the positional deviation.

Likewise, when a lock is detected in the tilt movement during the tilt-up operation, first the occurrence of the positional deviation detection in the tilt movement area is stored at step S47.

Next, when the tilt-up operation is performed again, it is determined at step S40, that a lock is not detected. Then, at step S41, the sliding roof 4 slides to the fully-open tilt position Sa. Then, the processing proceeds to step S42 to determine whether or not a lock has been previously detected in the tilt movement area. As a result, if it is determined that the positional deviation has been previously detected in the tilt movement area, it is determined that the previous lock detection in the tilt movement area is caused by the intrusion of foreign object or the like and the foreign object has been already removed. Then, at step S50, the condition is changed to the condition without detection of the positional deviation.

By the foregoing design, it is possible to determine whether positional deviation occurs or not on the basis of the stop conditions of the sliding roof 4 not only when the sliding roof 4 slides toward the lock end located opposite to the lock end close to which the lock stop is detected, but also when it slides toward the lock end close to which the lock stop is detected. Thus, the conditions for determining whether or not the positional deviation occurs are increased, which makes it possible to efficiently prevent occurrence of the event that the non-discriminating state lasts for a long time, thereby forcing positional deviation to continue causing a malfunction of the sliding roof 4. In addition, increasing determination conditions make it possible to determine more accurately whether or not positional deviation occurs.

The above embodiment may be modified in various ways without departing from the spirit of the present invention.

What is claimed is:

1. A sliding member controller comprising:
   a drive motor for sliding a sliding member in a slidable range from a first lock end to a second lock end;
   operating area setting means which sets, as an operating area of the sliding member, a predetermined range in the slidable range with respect to one of the first and second lock ends;
   drive motor control means which controls the drive motor such that an operating range of the sliding member by the drive motor falls within the operating area;
   stop detecting means which detects a stop of the sliding member;
   stop information storage means which stores stop information representing occurrence of the stop on an assumption that there is a possibility of occurrence of positional deviation in the set operating area when the stop detecting means detects the stop of the sliding member in the operating area close to the first lock end; and positional deviation determination means which determines whether or not the positional deviation occurs in the set operating area based on a stop condition when the sliding member is operated again to come into contact with the second lock end and is stopped in a state where the stop information storage means stores the stop information.

2. The sliding member controller according to claim 1, wherein:

the stop information storage means stores a stop position of the sliding member as the stop information.

3. The sliding member controller according to claim 1, wherein:

the drive motor control means allows an operation of the sliding member until the sliding member comes into contact with the lock end at a side of the second lock end, when the stop information storage means stores the stop information representing the occurrence of the stop at a side of the first lock end.

4. The sliding member controller according to claim 1, wherein:

the positional deviation determination means determines a state of the positional deviation in the set operating area in accordance with a traveling distance of the sliding member from the stop position close to the first lock end until the sliding member comes into contact with the second lock end and stops.

5. The sliding member controller according to claim 4, wherein:

the positional deviation determination means determines the occurrence of the positional deviation in the set operating area, when the traveling distance is equal to or longer than the slidable range, and the positional deviation determination means makes correction to an output of measuring means, which measures a position of the sliding member, thereby to eliminate the positional deviation in the output of the measuring means only when the traveling distance is equal to or longer than the slidable range.

6. The sliding member controller according to claim 4, wherein:

the positional deviation determination means determines no occurrence of the positional deviation in the set operating area, when the traveling distance is shorter than the slidable range, and the positional deviation determination means makes no correction to an output of measuring means, which measures a position of the sliding member, unless the traveling distance is equal to or longer than the slidable range.

7. The sliding member controller according to claim 1, wherein:

the positional deviation determination means determines no occurrence of positional deviation in the set operating area, when the sliding member slides either to an end of an operating area close to the first lock end or to a position closer to the first lock end than the end when the sliding member re-operates to slide toward the same lock end as the first lock end, in a state where the stop information storage means stores the stop information.

8. A sliding member controller for a vehicle having a sliding member, the controller comprising:

a drive motor for sliding the sliding member in a slidable range between two lock ends;

a position detector coupled to the drive motor for detecting a position of the sliding member by counting a number of pulses, each of which is generated at a predetermined angular rotation of the drive motor;

a memory for storing data including a count of the pulses of the position detector; and a processing unit for controlling the drive motor in accordance with the position of the sliding member detected by the position detector, wherein the processing unit is configured to (1) store, in the memory, stop information indicating a stop of the sliding member when the sliding member is stopped near one of the lock ends, (2) drive the drive motor after the stop information has been stored in the memory so that the sliding member travels between the two lock ends until the sliding member is stopped again, (3) measure a travel distance of the sliding member based on the count of the position detector, and (4) determine whether a positional deviation of the sliding member is present based on the travel distance measured in response to the stop information.

9. The sliding member controller according to claim 8, wherein the processing unit is further configured to:

determine a presence of the positional deviation, when the measured travel distance is equal to or longer than a predetermined distance; and corrects the count of the position detector only when the presence of the positional deviation is determined.

10. The sliding member controller according to claim 8, wherein the processing unit is further configured to:

drive the drive motor after the stop information has been stored in the memory in a direction from near the one of the two lock ends toward the other of the two lock ends.

* * * * *